United States Patent
Fukuzawa et al.

(10) Patent No.: US 8,166,997 B2
(45) Date of Patent: May 1, 2012

(54) TOILET FLUSH WATER SUPPLY DEVICE

(75) Inventors: Eiji Fukuzawa, Fukuoka (JP);
Yoshinobu Uchimura, Fukuoka (JP);
Qing Zhang, Fukuoka (JP); Shan Lin,
Xiamen (CN); Fu Shan Chen, Xiamen
(CN)

(73) Assignee: Toto, Ltd (JP)

( * ) Notice: Subject to any disclaimer, the term of this patent is extended or adjusted under 35 U.S.C. 154(b) by 703 days.

(21) Appl. No.: 12/237,484

(22) Filed: Sep. 25, 2008

(65) Prior Publication Data

US 2009/0083902 A1    Apr. 2, 2009

(30) Foreign Application Priority Data

Sep. 27, 2007 (JP) ................. 2007-251991
Aug. 25, 2008 (JP) ................. 2008-215825

(51) Int. Cl.
*F16K 31/18* (2006.01)
(52) U.S. Cl. ............... 137/444; 137/434; 5/391; 5/395
(58) Field of Classification Search ............... 137/414,
137/426, 427, 430, 434, 393, 444, 315.08;
4/402, 404, 395, 391, 353, 394; 73/221,
73/305, 322.5, 861.57
See application file for complete search history.

(56) References Cited

U.S. PATENT DOCUMENTS

| | | | | |
|---|---|---|---|---|
| 1,107,268 A * | 8/1914 | Davis | ............ | 137/426 |
| 1,146,558 A * | 7/1915 | Fenton | ............ | 137/426 |
| 2,607,364 A * | 8/1952 | Smith | ............ | 137/444 |
| 2,752,936 A * | 7/1956 | Cantalupo | ............ | 137/414 |
| 3,610,271 A * | 10/1971 | Jarvis | ............ | 137/412 |
| 3,709,246 A * | 1/1973 | Kachergis | ............ | 137/444 |
| 4,080,986 A * | 3/1978 | Schoepe | ............ | 137/426 |
| 4,135,263 A * | 1/1979 | Anderson | ............ | 4/324 |
| 4,338,964 A * | 7/1982 | Schoepe | ............ | 137/426 |
| 4,945,944 A * | 8/1990 | Chen | ............ | 137/426 |
| 5,073,995 A * | 12/1991 | Jennison et al. | ............ | 4/415 |
| 5,255,703 A * | 10/1993 | Johnson | ............ | 137/426 |
| 5,280,803 A * | 1/1994 | Swift et al. | ............ | 137/414 |
| 5,337,781 A * | 8/1994 | Johnson | ............ | 137/434 |
| 5,439,025 A * | 8/1995 | Johnson | ............ | 137/426 |
| 5,715,859 A * | 2/1998 | Nichols-Roy | ............ | 137/426 |
| 5,836,346 A * | 11/1998 | Nichols-Roy | ............ | 137/414 |
| 5,878,775 A * | 3/1999 | Tamburro, Jr. | ............ | 137/426 |
| 5,904,176 A * | 5/1999 | Li | ............ | 137/434 |
| 5,964,247 A * | 10/1999 | Johnson | ............ | 137/426 |

(Continued)

FOREIGN PATENT DOCUMENTS

CN     200420096987     12/2005

(Continued)

*Primary Examiner* — Craig Schneider
*Assistant Examiner* — Craig J Price
(74) *Attorney, Agent, or Firm* — Brooks Kushman P.C.

(57) ABSTRACT

A toilet flush water supply device for supplying flush water to a flush water tank of a flush toilet is disclosed. The toilet flush water supply device comprises a water supply pipe connected to an external water supply source, a water supply valve for switching between spouting and stopping of flush water supplied from the water supply pipe into the flush water tank, a float for switching between the spouting and stopping of the above water supply valve by a vertical movement thereof linked to fluctuations in the flush water level within the flush water tank, and a float guide disposed on the outer surface of the water supply pipe for guiding the vertical motion of the float.

13 Claims, 18 Drawing Sheets

U.S. PATENT DOCUMENTS

| | | | | |
|---|---|---|---|---|
| 5,975,125 A * | 11/1999 | Nichols-Roy | ................ | 137/426 |
| 6,003,541 A * | 12/1999 | Nichols-Roy | ................ | 137/414 |
| 6,155,288 A * | 12/2000 | Johnson | ................ | 137/426 |
| 6,199,581 B1 * | 3/2001 | Gil | ................ | 137/426 |
| 6,260,574 B1 * | 7/2001 | Nichols-Roy | ................ | 137/414 |
| 6,478,044 B2 * | 11/2002 | Howe | ................ | 137/414 |
| 6,510,866 B2 * | 1/2003 | Li | ................ | 137/426 |
| 6,659,125 B1 * | 12/2003 | Autunez | ................ | 137/426 |
| 6,679,285 B2 * | 1/2004 | Pablo | ................ | 137/414 |
| 6,913,035 B2 * | 7/2005 | Huang | ................ | 137/444 |
| 7,661,438 B2 * | 2/2010 | Nichols-Roy et al. | ................ | 137/411 |
| 2006/0196550 A1 * | 9/2006 | Schuster et al. | ................ | 137/426 |

FOREIGN PATENT DOCUMENTS

JP      2006-274540      12/2006

* cited by examiner

TOILET FLUSH WATER SUPPLY DEVICE

CROSS-REFERENCE TO RELATED APPLICATIONS

This application claims foreign priority benefits under 35 U.S.C. §119(a)-(d) to JP 2007-251991, filed Sep. 27, 2007 and JP 2008-215825, filed Aug. 25, 2008, which are hereby incorporated by reference in their entirety.

BACKGROUND OF INVENTION

1. Field of the Invention

The present invention relates to a toilet flush water supply device, and more particularly to a toilet flush water supply device for supplying flush water to a flush toilet.

2. Description of the Related Art

Toilets in which a rim water spout port and a jet water spout port are formed in the bowl portion of a flush toilet and water is supplied to said water spout ports to discharge waste by siphon action have been conventionally known. Such flush toilets may be divided into those in which flush water is directly supplied from a water supply source (e.g. water main), and those in which flush water is supplied from a flush water tank provided on the flush toilet where it is stored.

As an example of a flush toilet furnished with such a flush water tank, JP-A-2006-274540 discloses a flush toilet flush water supply device provided with a ball tap (water supply valve) having a pilot-type diaphragm valve in a flush water tank for supplying flush water into a flush water tank from an external water supply source (water main).

In the toilet flush water supply device used in the toilet set forth in JP-A-2006-274540, a ball tap (water supply valve) having a pilot-type diaphragm valve is formed at the top end of a water supply pipe connected to an external water supply source (water main), such that a float penetrates the water supply pipe and is capable of up or down movement.

Because the float is attached by penetrating the water supply pipe in a toilet flush water supply device of this structure, assembly of the device is undesirably complicated. Also, when the float rises with the rise of the flush water level, there is a large amount of looseness such that the float is unable to rise smoothly. Moreover, when the float rises and the diaphragm valve pilot hole is blocked so as to switch from spouting to stopping water, fluctuations in supply water pressure, flush water level, and the like cause fluctuations in the downward pushing force (downward) blocking the pilot hole, and the buoyancy (upward) of the float, thereby causing a hunting phenomenon to arise leading to vibration and anomalous noise as the float vibrates. This has been a problem particularly with high supply source water pressure, increasing the tendency for the hunting phenomenon to occur.

SUMMARY OF THE INVENTION

It is therefore an object of the present invention is to provide a toilet flush water supply device in which the float can move smoothly up or down, and the occurrence of the hunting phenomenon occurring when the water supply valve is switched from spouting to stopping water flow can be prevented.

In order to achieve the above objects, the present invention provides a toilet flush water supply device for supplying flush water to a flush water tank of a flush toilet, the device comprising a water supply pipe connected to an external water supply source, a water supply valve for switching between spouting and stopping of flush water supplied from the water supply pipe into the flush water tank, a float for switching between the spouting and stopping of the above water supply valve by a vertical movement thereof linked to fluctuations in the flush water level within the flush water tank, and a float guide disposed on the outer surface of the water supply pipe for guiding the vertical motion of the float.

In the present invention thus constituted, the float guide is disposed on the outer surface of the water supply pipe, with the float guide portion used to guide the up or down movement of the float, thereby causing the surface at which the float and the float guide portion make contact to approach the up or down moving float, thus reducing the gap formed at that contact surface so that looseness can be reduced and the float vertical motion can be smoothly guided.

In a preferred embodiment of the present invention, the float guide is formed so as to be vertically adjustable on the outer surface of the water supply pipe.

In the embodiment of the present invention thus constituted, the float guide is disposed so as to be vertically adjustable on the outer surface of the water supply pipe, therefore setting or changing of the vertical position of the float can be easily accomplished, and the storage water level in the flush water tank can be easily adjusted.

In a preferred embodiment of the present invention the float guide is disposed so as to be horizontally detachable from the outer surface of the water supply pipe.

In the embodiment of the present invention thus constituted, the float guide is disposed so as to be horizontally detachable from the outer surface of the water supply pipe, therefore the float guide can be attached to the water supply pipe with the water supply pipe affixed to the flush water tank, facilitating assembly of the flush water supply device.

In a preferred embodiment of the present invention the float guide is disposed so as to penetrate the water supply pipe.

In the embodiment of the present invention thus constituted, the float guide penetrates the water supply pipe, therefore the float guide does not separate from the water supply pipe, and can be securely affixed thereto.

In a preferred embodiment of the present invention, a part of the flow guide guiding the float and/or a part of the float guided by the float guide includes a plurality of ribs extending in a vertical direction from the top edge to the bottom edge thereof.

In the preferred embodiment of the present invention thus constituted, a plurality of ribs are provided, and a vertical motion of the float is guided by making contact with that plurality of ribs, therefore die adjustment for adjusting looseness between the float and the float guide can be easily accomplished, and sliding resistance can be reduced. Reducing looseness also allows the float hunting phenomenon to be suppressed.

In a preferred embodiment of the present invention, the float includes a water storage enclosure portion formed on the upper portion thereof for receiving and storing at least a portion of the flush water spouted from the water supply valve when the water supply valve is in the water spouting state, and discharging the stored flush water when the water supply valve is in the water stopping state.

In the preferred embodiment of the present invention thus constituted, the weight of the flush water stored in the water storage enclosure portion acts, separate from buoyancy, in a downward direction on the float, and when the water supply valve switches over to a water stopping state, this flush water weight suddenly stops acting thereon, such that a large upward pressing force (buoyancy) acts on the float, enabling the unstable region in which the hunting phenomenon occurs to be passed through in a short period, and hunting to be suppressed.

In a preferred embodiment of the present invention, the water supply valve includes a spout pipe for spouting the flush water at supply source pressure to the water storage enclosure portion of the float, and the diameter of the water spout pipe expands toward the direction in which water is spouted.

In the embodiment of the present invention thus constituted, in addition to buoyancy a downward jet water pressure (supply source water pressure) from the water spout pipe acts on the float over a relatively wide range when the water supply valve is in the spouting state, and the jet water pressure suddenly stops acting thereon when the water supply valve changes to the water stopping state, therefore the unstable region in which the hunting phenomenon occurs can be passed through in a short time, and the hunting phenomenon suppressed. Moreover, there is a greater tendency for the hunting phenomenon to occur when the water pressure from the supply source is high, but in such cases high pressure flush water is spouted from the spout pipe, therefore an upward pressing force also increases by that higher pressure amount, making it possible to more effectively suppress the hunting phenomenon.

In a preferred embodiment of the present invention, the float includes a cover for covering at least the vicinity of the opening portion of the water storage enclosure portion for receiving the flush water.

In the embodiment of the present invention thus constituted, the float is provided with the cover for covering the vicinity of the opening portion of the water storage enclosure portion for receiving the flush water, so that splashing of the flush water can be prevented, as can noise caused by flush water supplied to the water storage enclosure portion.

The toilet flush water supply device of the present invention enables an easy assembly, a smooth vertical movement of the float, and prevention of the hunting phenomenon occurring when the water supply valve is switched from spouting water to stopping water.

DETAILED DESCRIPTION OF THE PREFERRED EMBODIMENTS

Below, referring to the attached drawings, a toilet flush water supply device according to embodiments of the present invention will be explained.

Figure 1:
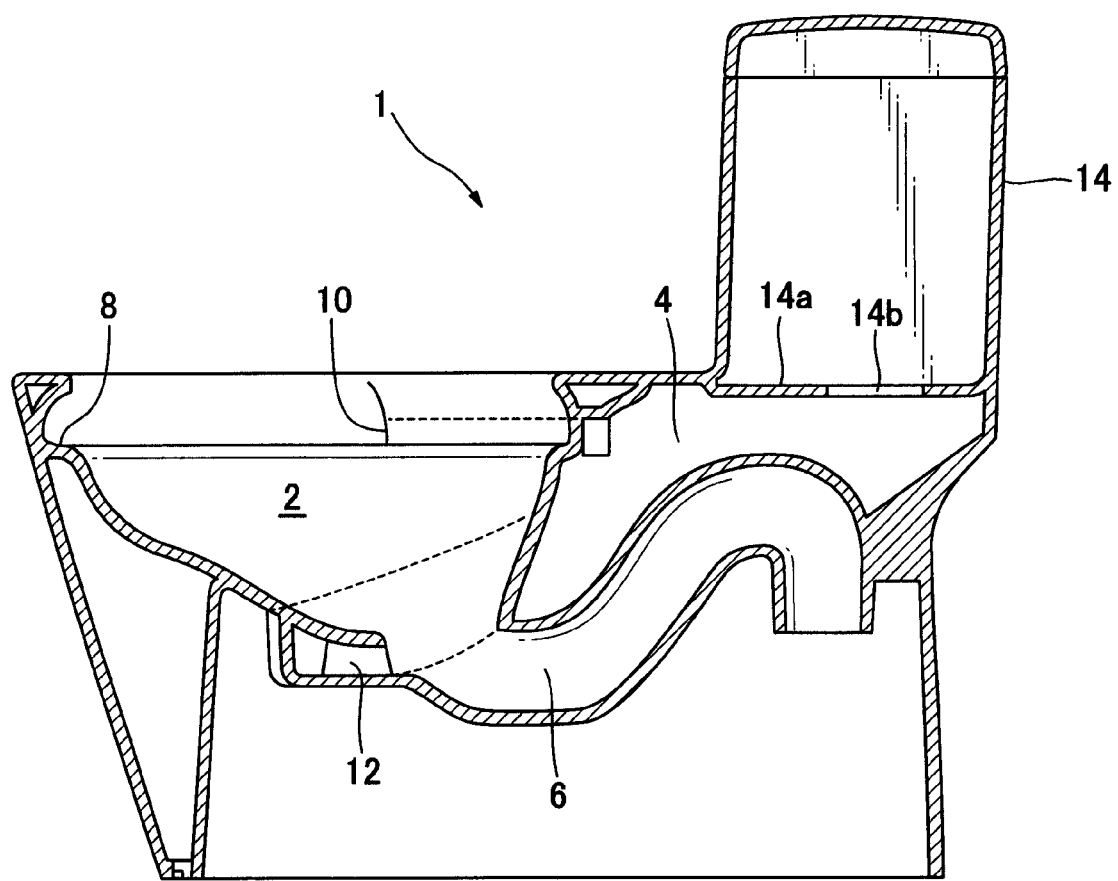
FIG. 1 is a sectional view of a flush toilet to which the toilet flush water supply device of the present invention has been applied.

First, referring to FIG. 1, an example of a toilet to which the toilet flush water supply device of the present invention is applied will be explained. FIG. 1 is a sectional view of a flush toilet to which the toilet flush water supply device of the present invention is applied. As shown in FIG. 1, reference numeral 1 indicates a flush toilet, a bowl portion 2 is formed on the upper front side of this flush toilet 1, and a water conduit 4 is formed on the rear side upper portion thereof, while a discharge trap pipe 6 connecting the bowl portion 2 is formed at the bottom of the water conduit 4.

An overhanging rim 8 is formed at the upper edge portion of the bowl portion 2 of flush toilet 1, one or two rim spout ports 10 to which flush water is supplied from the water conduit 4 are formed on this rim 8, and flush water descends as it swirls to clean the bowl portion 2. A jet spout port 12 to which flush water is supplied from the water conduit 4 is formed at the center lower portion of the bowl portion 2, flush water is spouted from this jet spout port 12 toward the discharge trap pipe 6 so that siphoning occurs in a short period of time.

A flush water tank 14 for storing flush water is disposed at the top of the flush toilet 1 water conduit 4. A connecting port 14b connected to the flush toilet 1 water conduit 4 is formed at the bottom surface 14a of the flush water tank 14. As further described below, a variety of devices, including the toilet flush water supply device of the present invention, are provided within this flush water tank 14.

Figure 2:
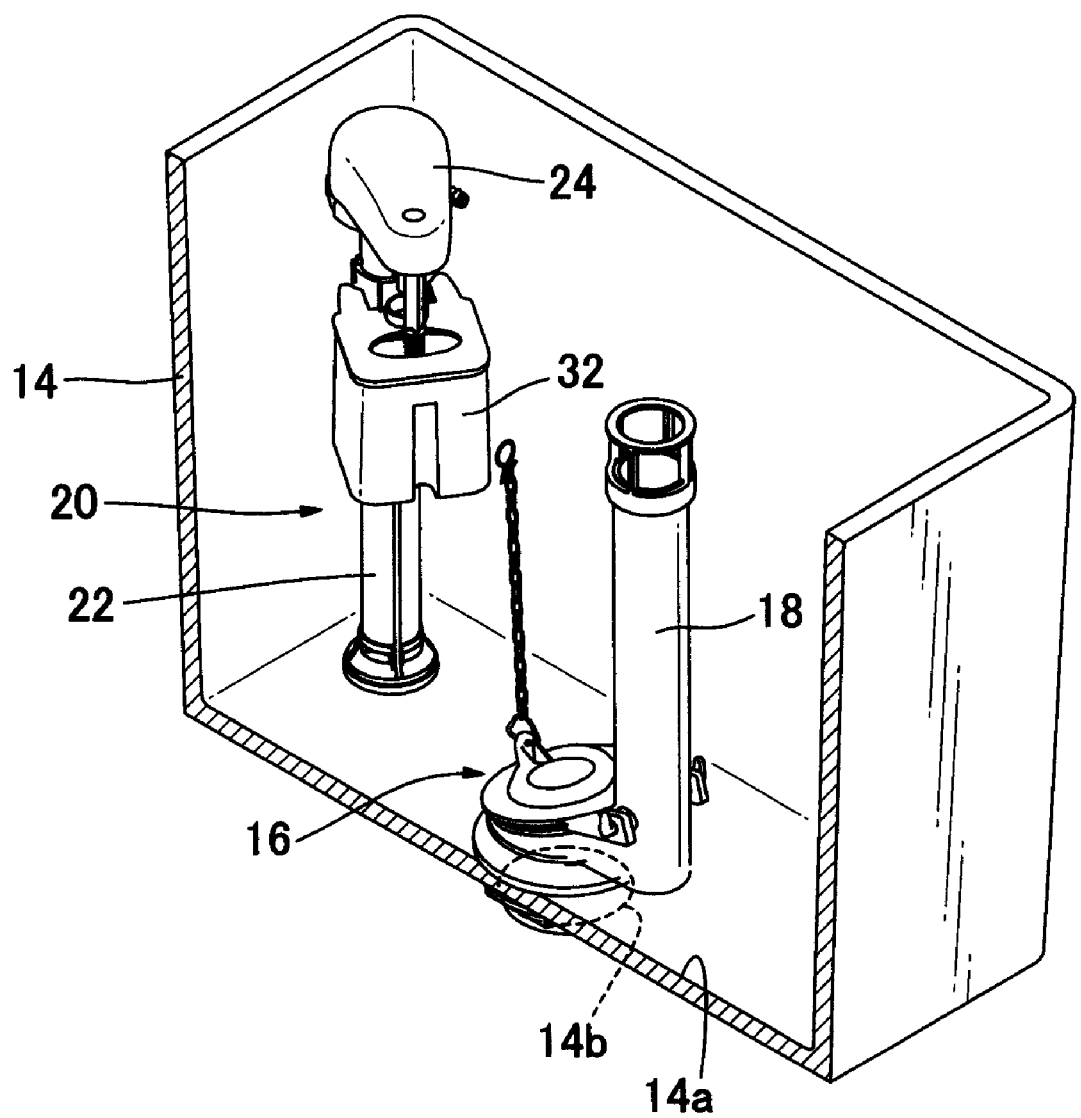
FIG. 2 is a sectional perspective view showing the interior of a flush water tank including the toilet flush water supply device of the present invention.
Figure 3:
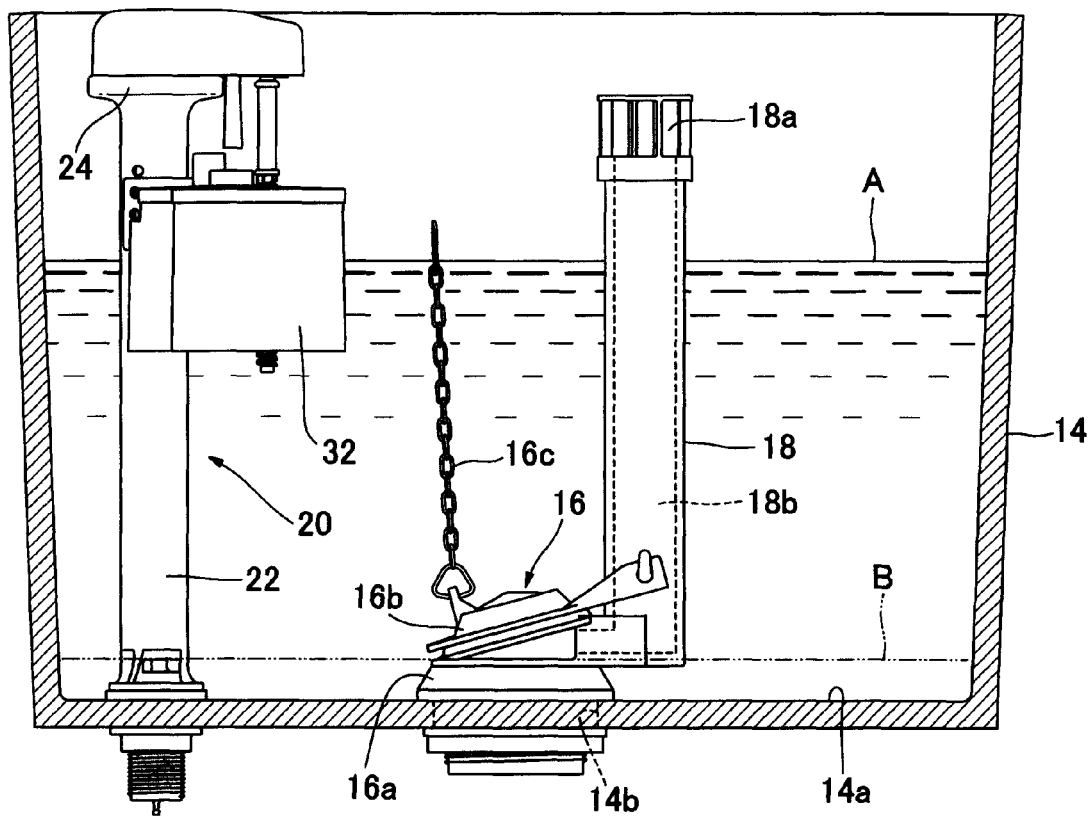
FIG. 3 is a front elevation showing the interior of a flush water tank including the toilet flush water supply device of the present invention.

Next, referring to FIGS. 2 and 3, the various devices are disposed within the flush water tank 14. FIG. 2 is a sectional perspective view showing the interior of a flush water tank, FIG. 3 is a front elevation showing the interior of a flush water tank.

As shown in FIGS. 2 and 3, a discharge valve 16 and an overflow pipe 18 are formed inside the flush water tank 14.

Specifically, the discharge valve 16 is disposed on the connecting port 14b part of the bottom surface 14a of the flush water tank 14, and is furnished with a valve seat 16a, a valve body 16b, and a chain 16c connected to the valve body 16b, operation of a control lever (not shown) connected to the chain 16c causes the valve body 16b to move up or down, thus opening and closing [the valve].

Closing the discharge valve 16 causes flush water to be accumulated in the flush water tank 14, opening it causes flush water in the flush water tank 14 to be guided to the rim spout ports 10 and the jet spout port 12 via the flush toilet 1 water conduit 4.

An opening 18a is formed at the top edge of the overflow pipe 18, while the bottom edge thereof is disposed to connect with the discharge valve 16 valve seat 16a. With this overflow pipe 18, flush water overflows from the opening 18a if by some chance the flush water level rises, passing through the discharge valve 16 valve seat 16a and through the flush toilet 1 water conduit 4 to be discharged into the bowl portion 2 from the rim spout ports 10 and the jet spout port 12.

Moreover, a toilet flush water supply device 20 according to a first embodiment of the present invention is disposed within the flush water tank 14. As shown in FIGS. 2 and 3, the toilet flush water supply device 20 is furnished with a water supply pipe 22, a water supply valve 24, a water spout pipe 26, and a float 32 or the like.

Next, referring to FIGS. 4 through 12, details of a toilet flush water supply device according a first embodiment of the present invention will be explained.

Figure 4:
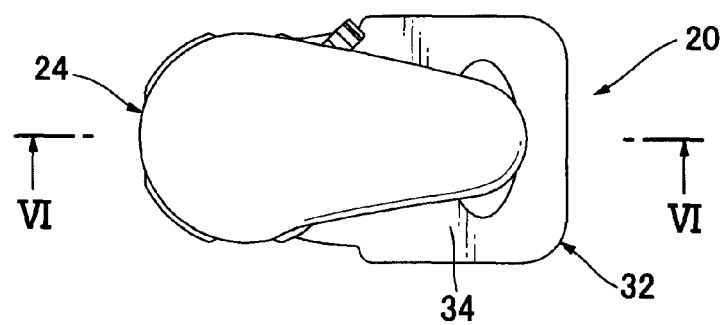
FIG. 4 is a plan view showing a toilet flush water supply device according to a first embodiment of the present invention.
Figure 5:
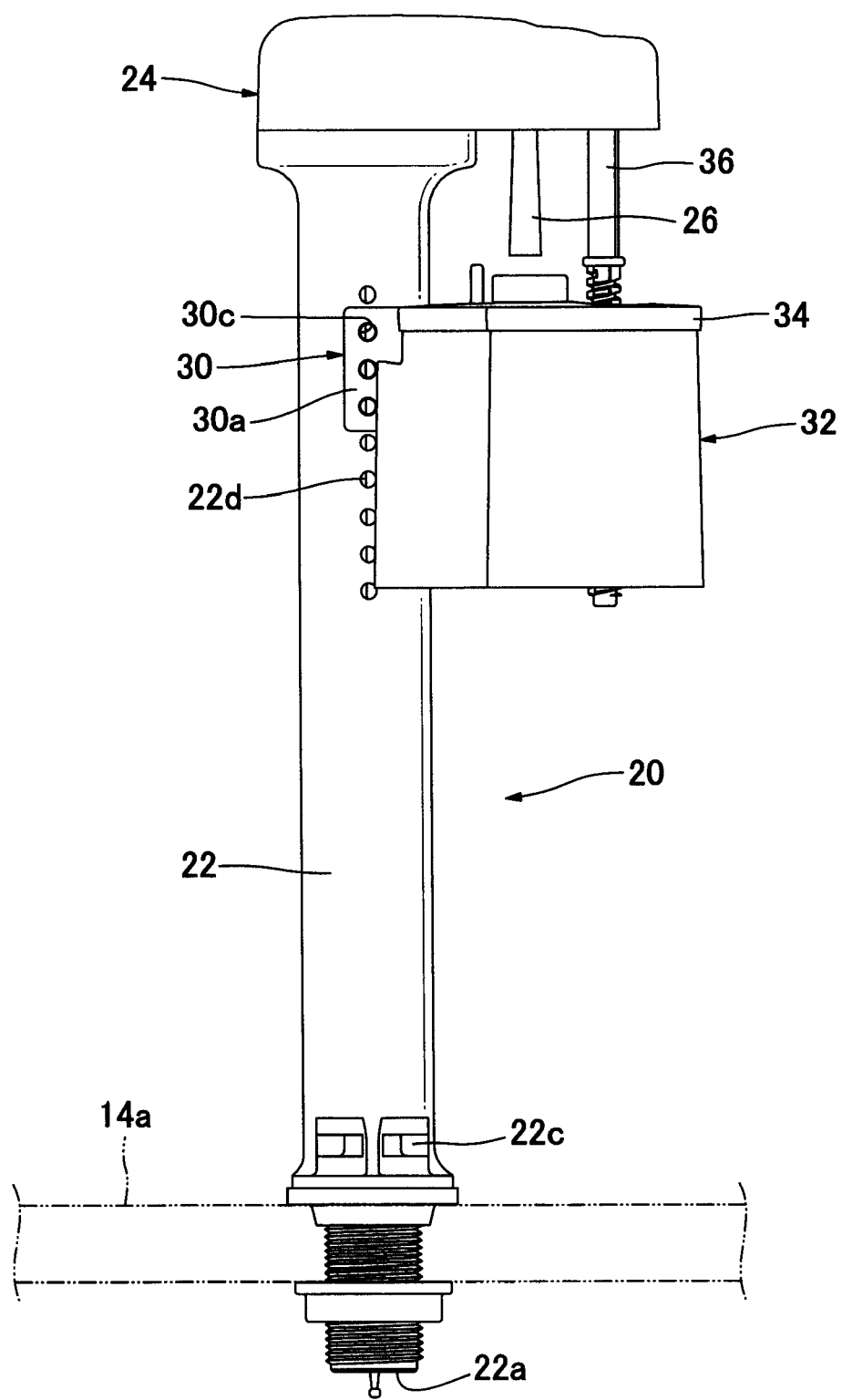
FIG. 5 is a front elevation view showing a toilet flush water supply device according to the first embodiment of the present invention.
Figure 6:
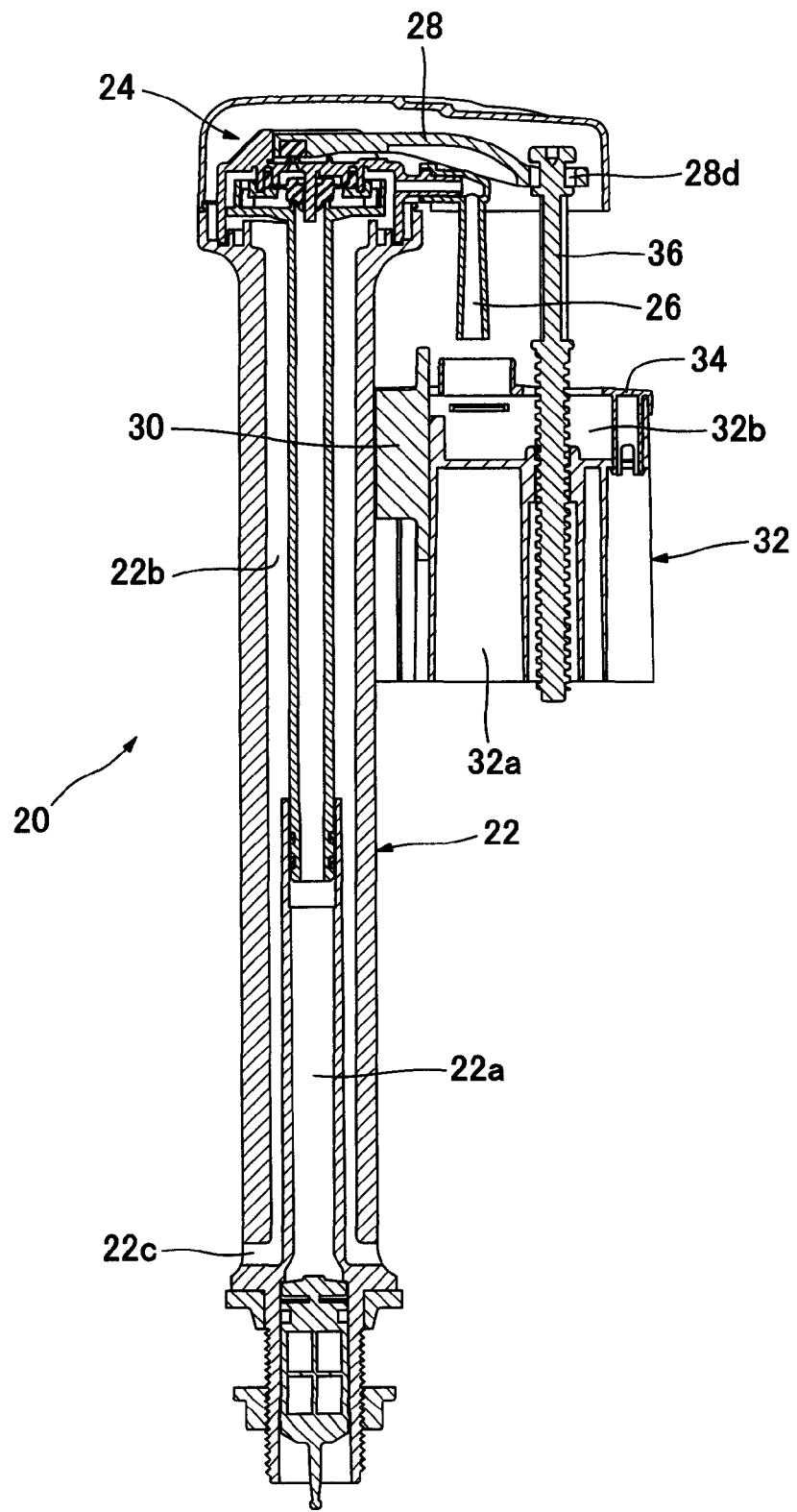
FIG. 6 is a sectional view along a line VI-VI in FIG. 4.

First, as shown in FIGS. 4 through 6, a water supply pipe 22 is attached to the bottom surface 14a of the flush water tank 14, and is connected to an external water main (not shown) to supply flush water into the flush water tank 14. A water supply path (primary side) 22a is formed at the center portion, and a water supply path (secondary side) 22b is formed at the outside portion of the water supply pipe 22, flush water is discharged into the flush water tank 14 from a discharge port 22c formed at the bottom edge portion of the water supply path 22b.

Next, as shown in FIGS. 6 through 12, a diaphragm-type water supply valve 24 is disposed at the end portion of the water supply pipe 22 between the water supply path 22a and the water supply path (secondary side) 22b. This water supply valve 24 comprises a valve housing 24b having a center shaft 24a, and a diaphragm 24c, attached to the center shaft 24a of the valve housing 24b and capable of up or down movement along the center shaft 24a. A pilot hole 24d is formed between the diaphragm 24c and the center shaft 24a, this pilot hole 24d connects the water supply pipe 22 water supply path (primary side) 22a and a back pressure chamber 24e on the back surface side (upper side) of the diaphragm 24c. A back pressure relief hole 24f is formed at the upper portion of the back pressure chamber 24e.

The water spout pipe 26 connected to the water supply pipe 22 water supply path 22a via the diaphragm 24c is integrally formed on the side surface at the float 32 side of the water supply valve 24 valve housing 24b. The shape of the water spout pipe 26 is constricted in section at the upper end portion 26a, broadening in diameter toward the direction of spouting at the bottom end side 26b (downward). The reason for this broadening of the water spout pipe 26 diameter toward the direction of spouting (downward) is to attain a downward pressing force from the jet flow by applying the jet flow spouted from the water spout pipe 26 over a relatively broad range.

In addition, an arm 28 is attached at the top surface of the water supply valve 24 valve housing 24b, this arm 28 is capable of a sliding motion centered on a support point 28a. A top seal 28b, which opens and closes the back pressure relief hole 24f, is attached to the left edge portion of the arm 28, while a float 32 described below is attached to the right edge portion thereof.

Figure 7:
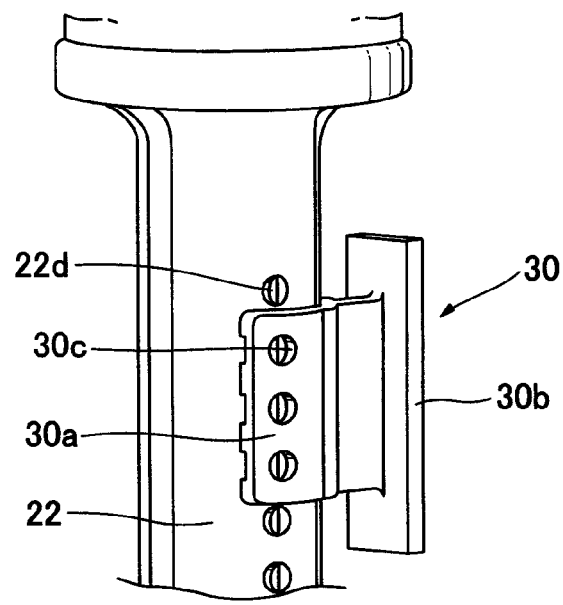
FIG. 7 is a perspective view showing a toilet flush water supply device float guide according to the first embodiment of the present invention.

Next, as shown in FIG. 7, the float guide 30 comprises a semi-cylindrical attaching portion 30a and a float sliding plate 30b. A plurality (two or more) of holes 30c are formed on the attaching portion 30a, and these holes 30c engage with a plurality (three or more) of bosses 22d formed on the outer surface of the water supply pipe 22

Thus in the present embodiment, because the float guide 30 is arranged so as to be easily removable and attachable to and from the water supply pipe 22 in the horizontal direction, the position of the float 32 direction can be adjusted up or down, and there is no need to remove the water supply pipe and the water supply valve from flush water tank, so the vertical position of the float 32 can be easily adjusted.

Figure 8:
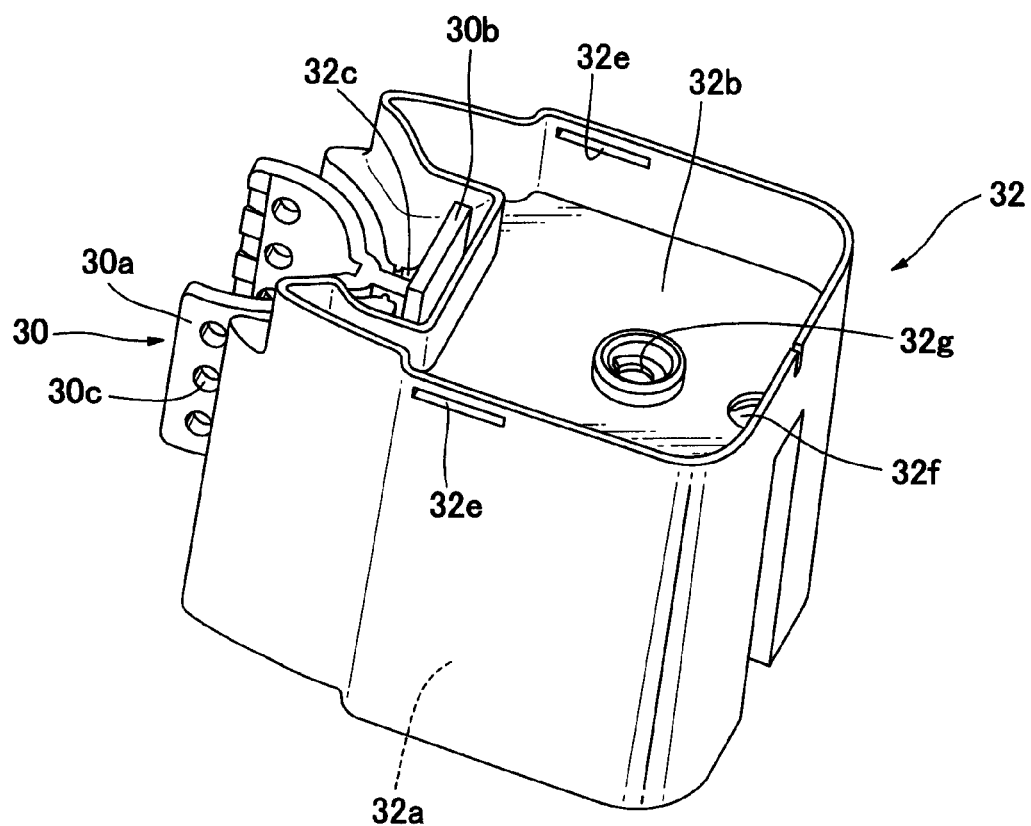
FIG. 8 is a perspective view showing a float with the cover portion removed in a toilet flush water supply device according to the first embodiment of the present invention.
Figure 9:
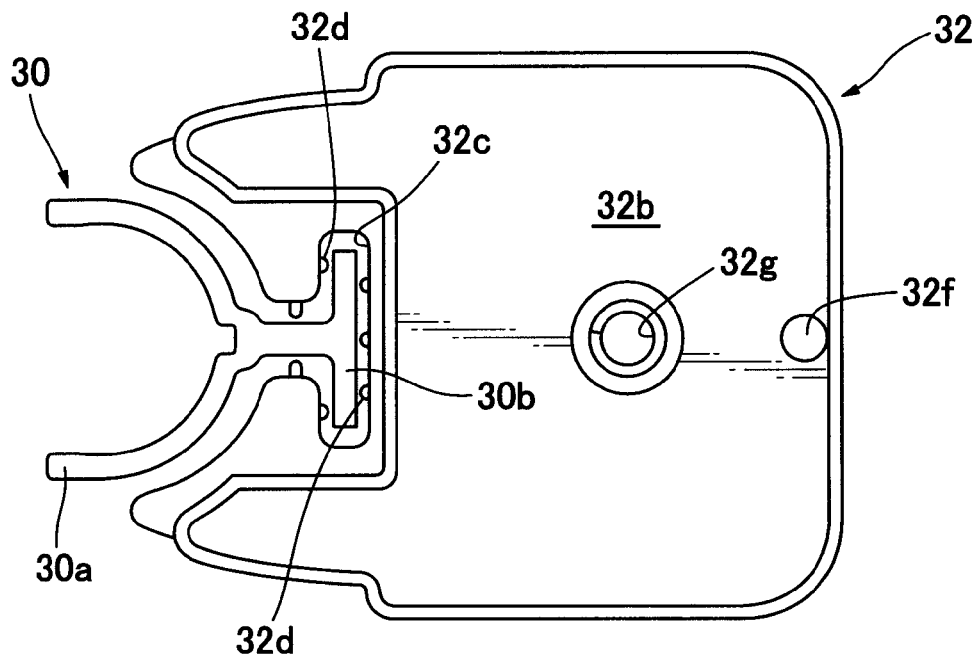
FIG. 9 is a plan view showing a float with the cover portion removed in a toilet flush water supply device according to the first embodiment of the present invention.

Next, as shown in FIGS. 6, 8, and 9, the float 32 comprises a buoyancy generating portion 32a, which is a space formed at the bottom thereof, a water storage enclosure portion 32b formed at the upper portion thereof for temporarily holding flush water, a cover portion 34 for covering a portion of the water storage enclosure portion 32b, and a concave portion 32c extending in the vertical direction for containing the float sliding plate 30b of the float guide 30 described above so that the float 32 is guided in a vertical direction.

As show in FIG. 6, the float 32 is connected to the right edge portion of the above-described arm 28 by a screw piece 36. A play space 28d is formed on the portion connecting the arm 28 and the screw piece 36 (see FIG. 12). The screw piece 36 is threaded into a threaded portion 32g formed on the float 32, so the distance between the arm 28 and the float 32 (i.e., the vertical position of the float 32) can be easily adjusted by rotating the screw piece 36.

More specifically, the contact surface between the concave portion 32c and the float sliding plate 30b, which serves as the contact surface between the float 32 and the float guide 30, is close to the threaded portion 32g into which the screw piece 36 forming the base point when the float 32 moves up or down is threaded, therefore the gap formed between the concave portion 32c and the float sliding plate 30b can be made smaller than the gap when the float 32 is caused to penetrate the water supply pipe 22, such that looseness can be reduced, and up or down movement of the float 32 can be smoothly guided. In addition, a plurality (5) of vertical ribs 32d extending in a vertical direction from the top end to the bottom end of the concave portion 32c on the float 32 are formed thereon. When the float 32 is guided by the float guide 30 float sliding plate 30*b* to moves up or down, it contacts the vertical ribs 32*d* so as to move smoothly up or down. As a result, modifications can be easily made to the mold to prevent looseness, and sliding resistance can also be reduced. In addition, reducing looseness enables a reduction in the occurrence of hunting, described below. The vertical ribs 32*d* may be formed on only the float guide 30 float sliding plate 30*b*, or may be formed on both the float 32 concave portion 32*c* and the float sliding plate 30*b*.

As shown in FIG. 8, a pair of slit-shaped channel portions 32*e* for engaging and attaching the cover portion 34 to the side portion are formed on the water storage enclosure portion 32*b*, a water drain hole 32*f* is next formed on the bottom of the end portion (right side end portion) thereof, and flush water stored in the water storage enclosure portion 32*b* can be discharged into the flush water tank 14.

Figure 10:
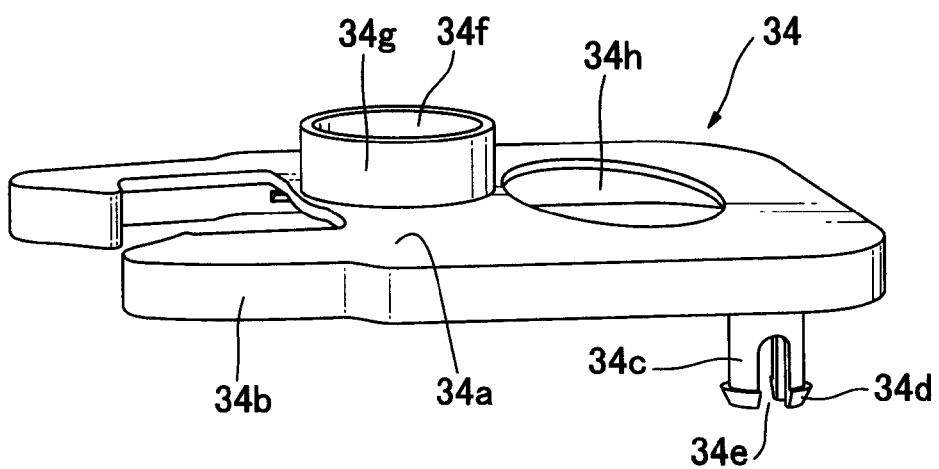
FIG. 10 is a perspective view showing the float cover portion of a toilet flush water supply device according to the first embodiment of the present invention.
Figure 11:
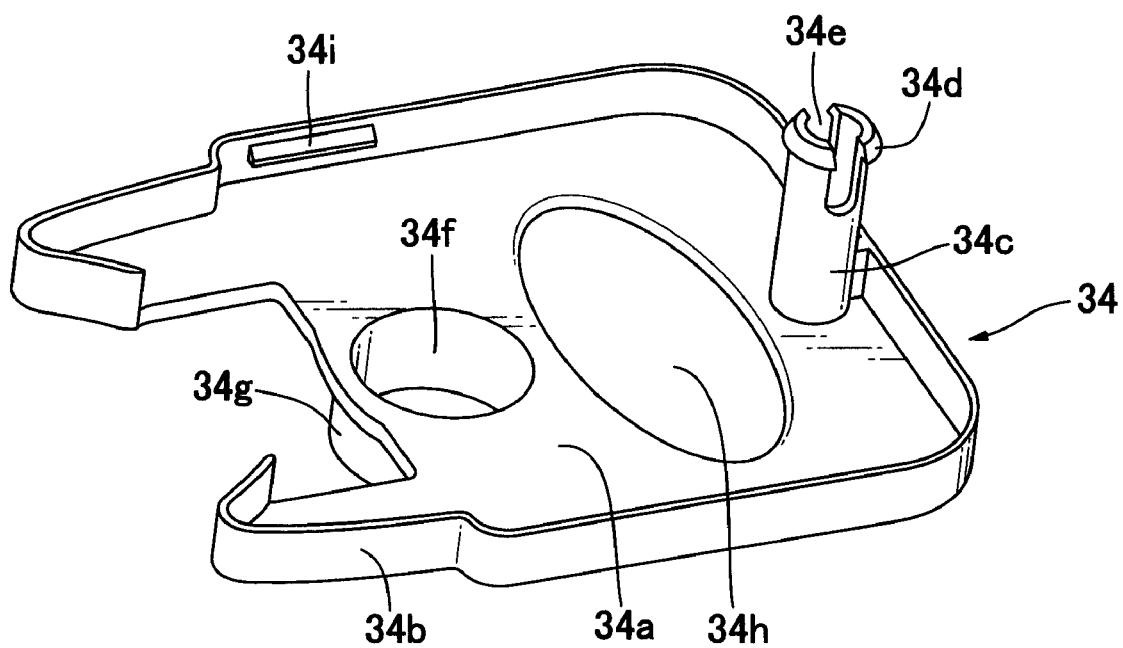
FIG. 11 is a perspective view showing an inverted float cover portion of a toilet flush water supply device according to the first embodiment of the present invention.

As shown in FIGS. 10 and 11, a flat surface portion 34*a* covering the majority of the water storage enclosure portion 32*b*, and a perimeter skirt portion 34*b* in which a portion of the rear part (the left side portion) is cut away to drain out flush water overflowing from the float 32, are formed on the cover portion 34. Also, on the cover portion 34, a downwardly extending post portion 34*c* is formed at the end portion (the right side portion) thereof, and a hook portion 34*d* for engaging with the above-described float 32 water drain hole 32*f*, as well as a channel portion 34*e* connecting the float 32 and the drain hole 32*f*, are also formed thereon. A jet flow hole 34*f* for receiving the jet flow of flush water jetted downward from the above-described water spout pipe 26 is opened into the cover portion 34, and a guard portion 34*g* surrounding the perimeter of the jet flow hole 34*f* is formed so as to project upward. This guard portion 34*g* and the flat surface portion 34*a* around the guard portion 34*g* prevent splashing of the jet flow from the water spout pipe 26. A bucket pressure relief hole 34*h* is formed on the cover portion 34 flat surface portion 34*a*, releasing flush water to the outside in order to prevent a rise in the pressure of flush water in the water storage enclosure portion 32*b*. In addition, a claw 34*i* engaging the float sliding plate 30*b* slit shaped channel portions 32*e* is formed on the perimeter skirt portion 34*b*. Thus the cover portion 34 is securely engaged in three locations to the float 32 (the water storage enclosure portion 32*b*), at the slit shaped channel portions 32*e* and the claw 34*i* (two locations), and the post portion 34*c* hook portion 34*d* (one location). Note that the above-described screw piece 36 penetrates into the interior of this enclosure pressure relief hole 34*h*.

Next, referring to FIGS. 12 and 13, the operation of a toilet flush water supply device according to a first embodiment of the present invention will be explained.

First, when flush water is sufficiently stored in the flush water tank 14, the flush water level is at the full level A (see FIG. 3). At that point the water supply valve 24 and the like is in the state described below.

Figure 12:
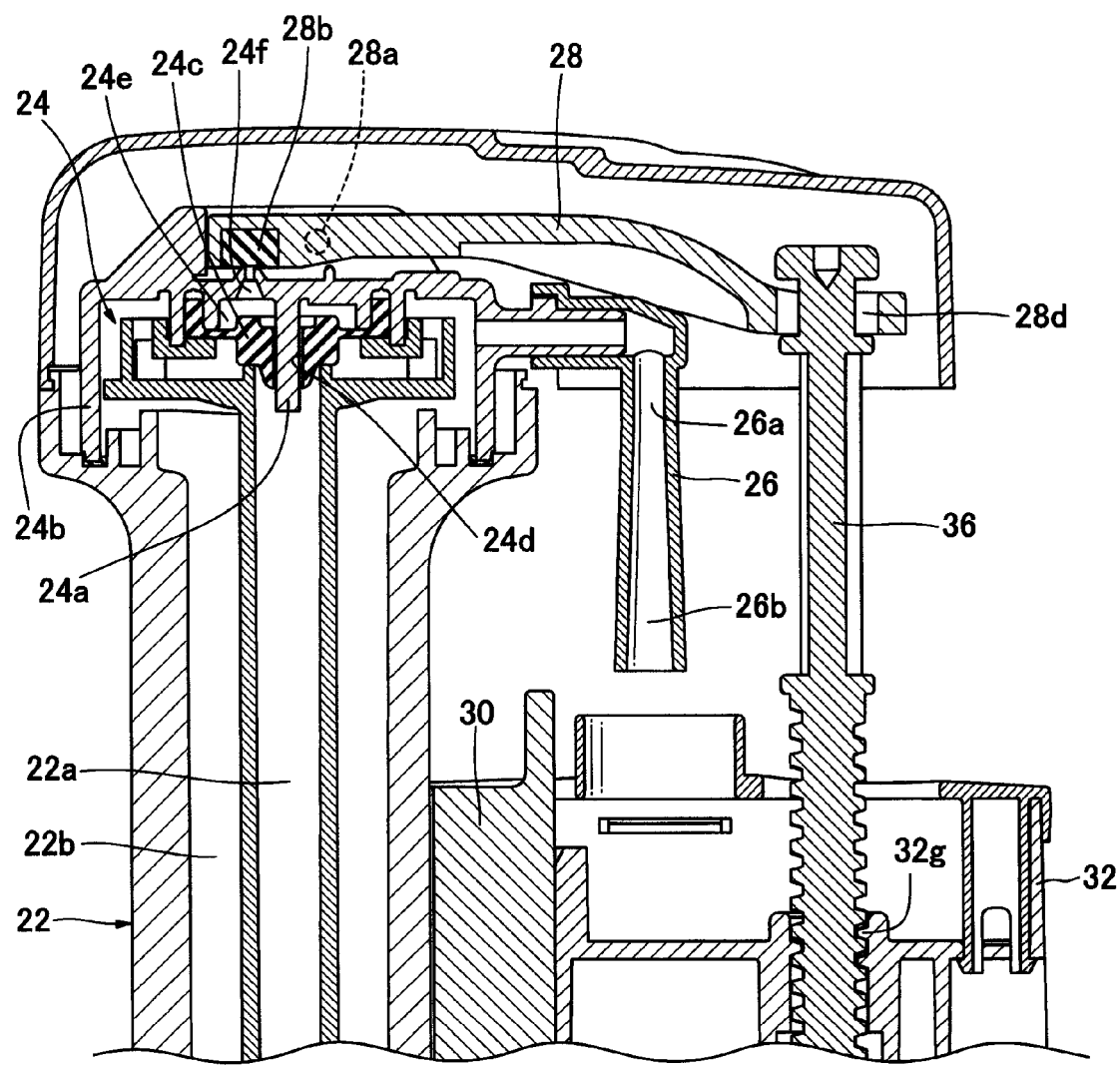
FIG. 12 is a partial sectional view showing a water supply valve in a closed state (water blocking state) in a toilet flush water supply device according to the first embodiment of the present invention.

As shown in FIG. 12, that is, the float 32 has risen to the upper position, the buoyancy thereof pushes the right side end of the arm 28 upward via the screw piece 36, so that the arm 28 is biased in a counter clockwise direction around the support point 28*a*, and the left side end of the arm 28 is pushed downward. As a result, the arm 28 top seal 28*b* closes the water supply valve 24 back pressure relief hole 24*f*. At this point the back pressure chamber 24*e* and the water supply pipe 22 water supply path (primary side) 22*a* are connected by the pilot hole 24*d*, so the pressure in the back pressure chamber 24*e* and the water supply path (primary side) 22*a* is equalized, resulting in a downward movement of the diaphragm 24*c* due to the ratio of surface areas pushing on the diaphragm 24*c* (back pressure chamber side surface area>primary side surface area), such that the valve is in a closed state. Note that in this closed state there is no jetting of a jet flow from the water spout pipe 26.

Next, after using the flush toilet 1, the user operates the control lever (not shown), the discharge valve 16 opens, and the flush toilet 1 is cleaned by the flow of the flush water stored in the flush water tank 14 to the flush toilet 1. Finally, the level of the flush water in the flush water tank 14 goes to level B, which is the empty state (see FIG. 3).

Thereafter the discharge valve 16 is closed, and, from the flush water tank 14 being in an empty state (the level B state), flush water is supplied into the flush water tank 14 from an external water supply (water main). At this point the state of the water supply valve 24 and the like is as follows.

Figure 13:
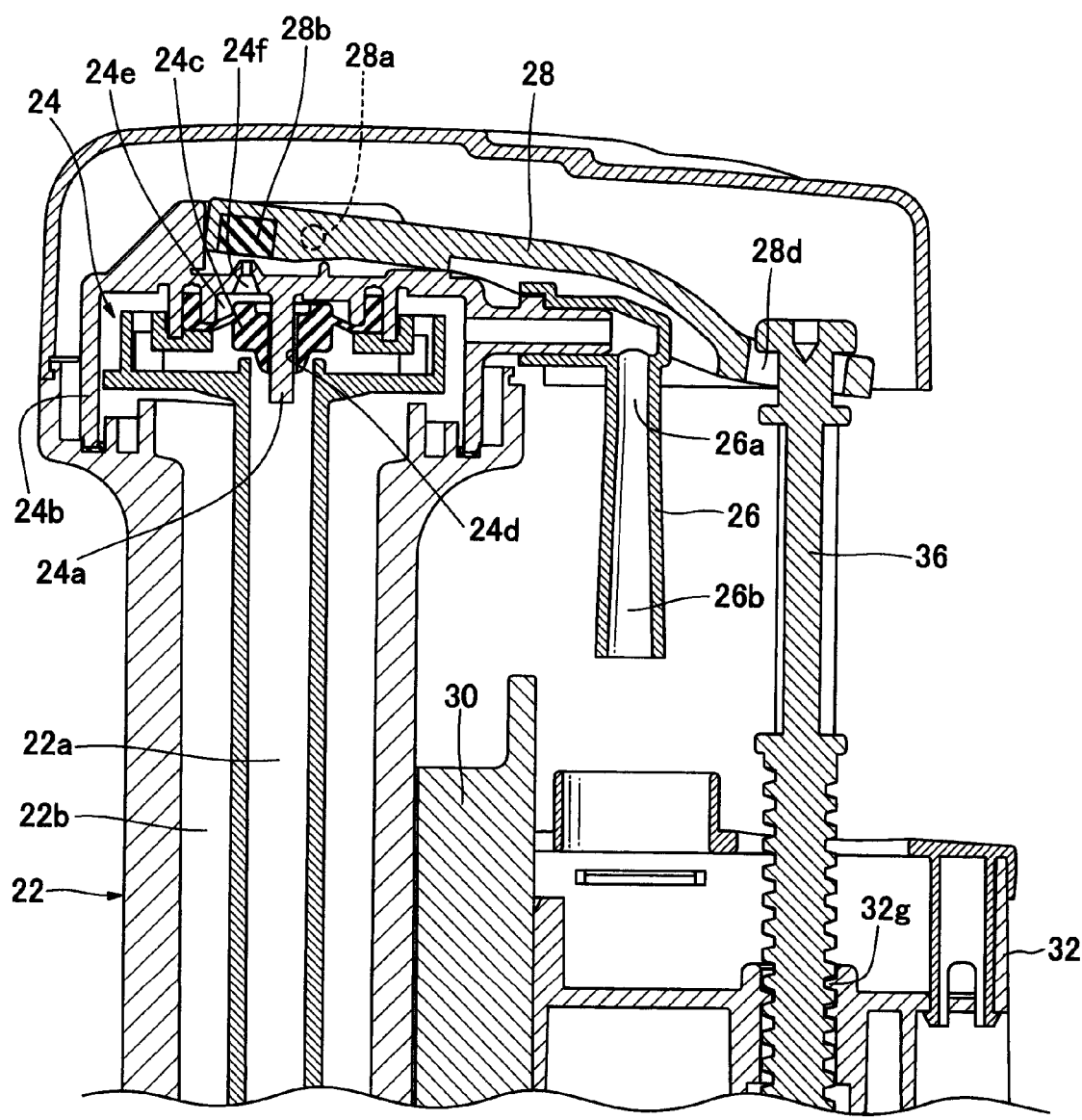
FIG. 13 is a partial sectional view showing a water supply valve in an open state (water supplying state) in a toilet flush water supply device according to the first embodiment of the present invention.

As shown in FIG. 13, that is, the float 32 falls to the low position where it is exposed out of the flush water, such that it is hanging in air from the right side end of the arm 28 by means of the screw piece 36. At this point the arm 28 is biased in a clockwise direction around the support point 28*a* by the weight of the float 32, and the left side end of the arm 28 is pushed upward. The top seal 28*b* of the arm 28 then opens the water supply valve 24 back pressure relief hole 24*f*, and the back pressure chamber 24*e* is opened to the atmosphere. As a result, the diaphragm 24*c* is pushed by the pressure (water main pressure) of the water supply path (primary side) 22*a* and enters an open valve state.

When the water supply valve 24 enters an open valve state, flush water from an external water supply source (water main) is supplied to a water supply path (primary side) of the water supply pipe 22 and discharged into the flush water tank 14 from the discharge port 22*c* via the water supply path 22*b*. The water level in the flush water tank 14 thus gradually rises.

At this point the flush water is also supplied from the water supply pipe 22 water supply path (primary side) to the water spout pipe 26, and a jet flow is jetted from the water spout pipe 26 toward the float 32 water storage enclosure portion 32*b* below. Thus the float 32 rises, upward buoyancy, the weight of the flush water stored in the water storage enclosure portion 32*b* (downward), and a downward pressing force caused by the jet flow from the water spout pipe 26 all act on the float 32 when it is floating in the flush water.

Thereafter when the water level in the flush water tank 14 rises to the full water level A shown in FIG. 3, the water supply valve 24 is closed as explained above, and supplying of flush water into the flush water tank 14 is stopped.

Referring to FIGS. 14 through 17, we next explain the hunting phenomenon which occurs with the switchover from the water supply valve 24 open valve state (water supplied) to the closed valve state (water stopped).

Figure 14:
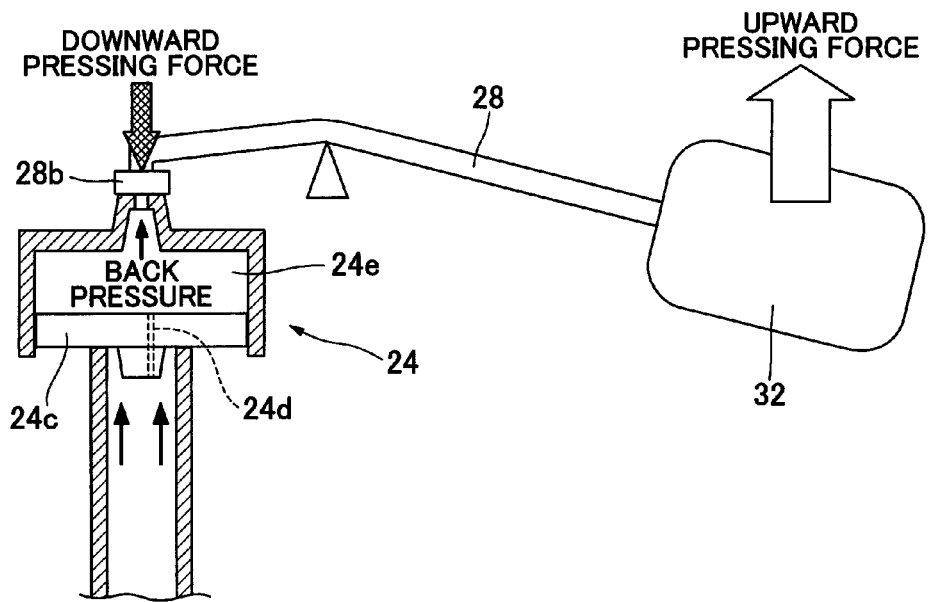
FIG. 14 is a schematic view showing the force acting on the water supply valve in a toilet flush water supply device according to the first embodiment of the present invention.

First, as shown in FIG. 14, when the water supply valve 24 switches over from the water supply state to the water stopped state, three forces operate, namely a downward pressing force acting on the top seal 28*b*, an upward back pressure acting on the back pressure chamber 24*e*, and an upward pushing force acting on the float 32 (the right end of the arm 28).

Figure 15:
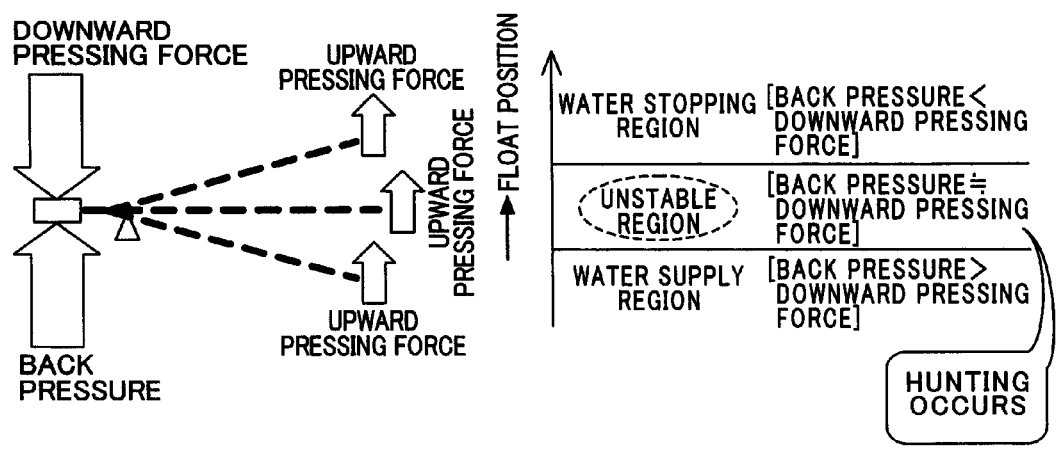
FIG. 15 is a schematic view showing the hunting phenomenon in a toilet flush water supply device according to the first embodiment of the present invention.

Next, as shown in FIG. 15, as the float 32 rises the position (water level) of the float 32 moves [through] a supply water region (backpressure force>downward pushing force), an unstable region (backpressure force is roughly equal to downward pressing force), and a stop water region (backpressure force<downward pressing force). The hunting phenomenon occurs in the unstable region for the following reason. In the unstable region, the downward pressing force fluctuates due to looseness or deformation of the arm 28, or due to tilting and the like of the arm 28 contact surface, the back pressure fluctuates due to water pressure fluctuations or the like of the supply water pressure, and the upward pressing force can easily fluctuate due to fluctuations in the flush water tank 14 water surface and the like, under those influences reliability in the water supply valve 24 water stopping region drops.

In the present embodiment, application of assistive force to the upward pressing force causes a transition from the water supply region to the water stopping stable region, skipping directly past the unstable region, thereby preventing the occurrence of the hunting phenomenon.

Figure 16:
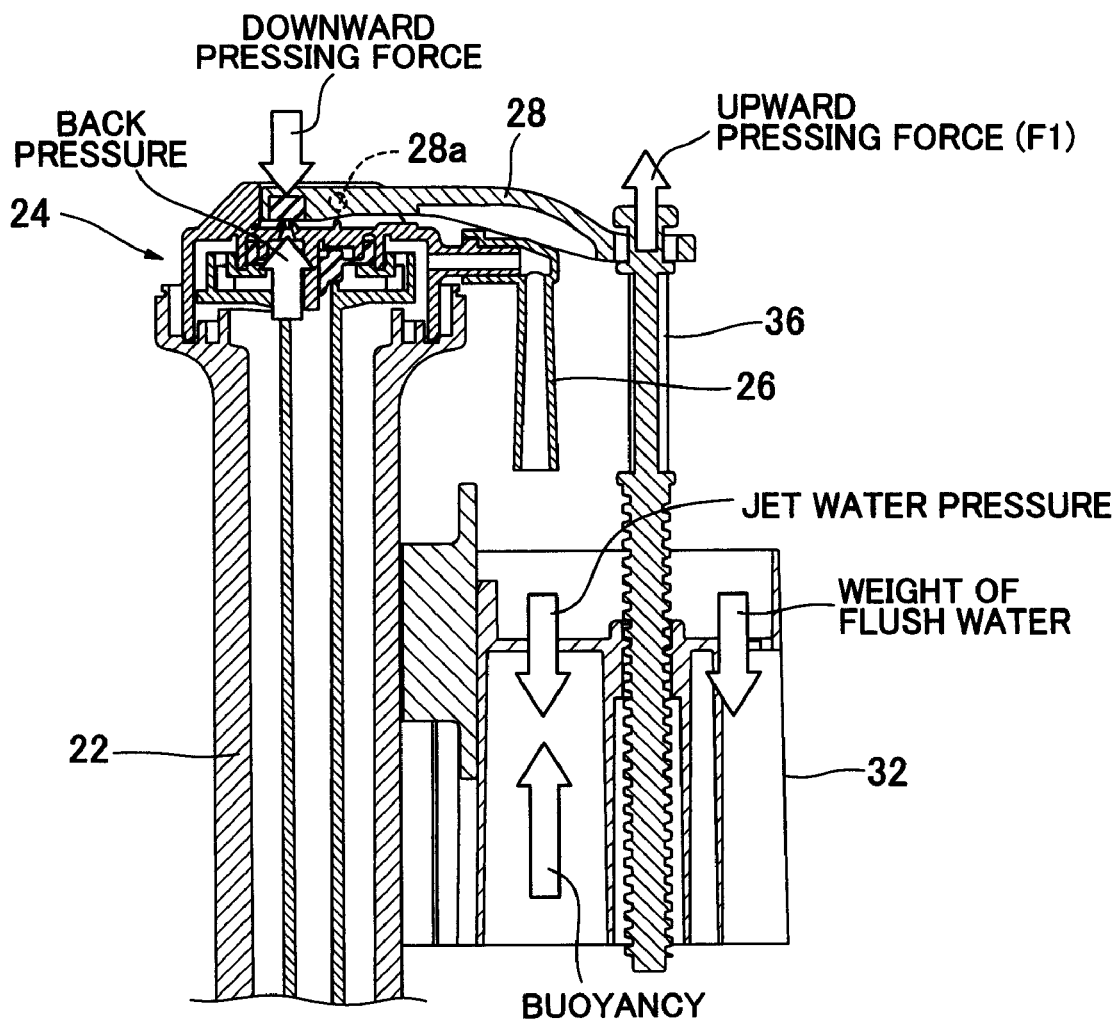
FIG. 16 is a partial sectional view showing a water supply valve immediately after blocking water flow in a toilet flush water supply device according to the first embodiment of the present invention.
Figure 17:
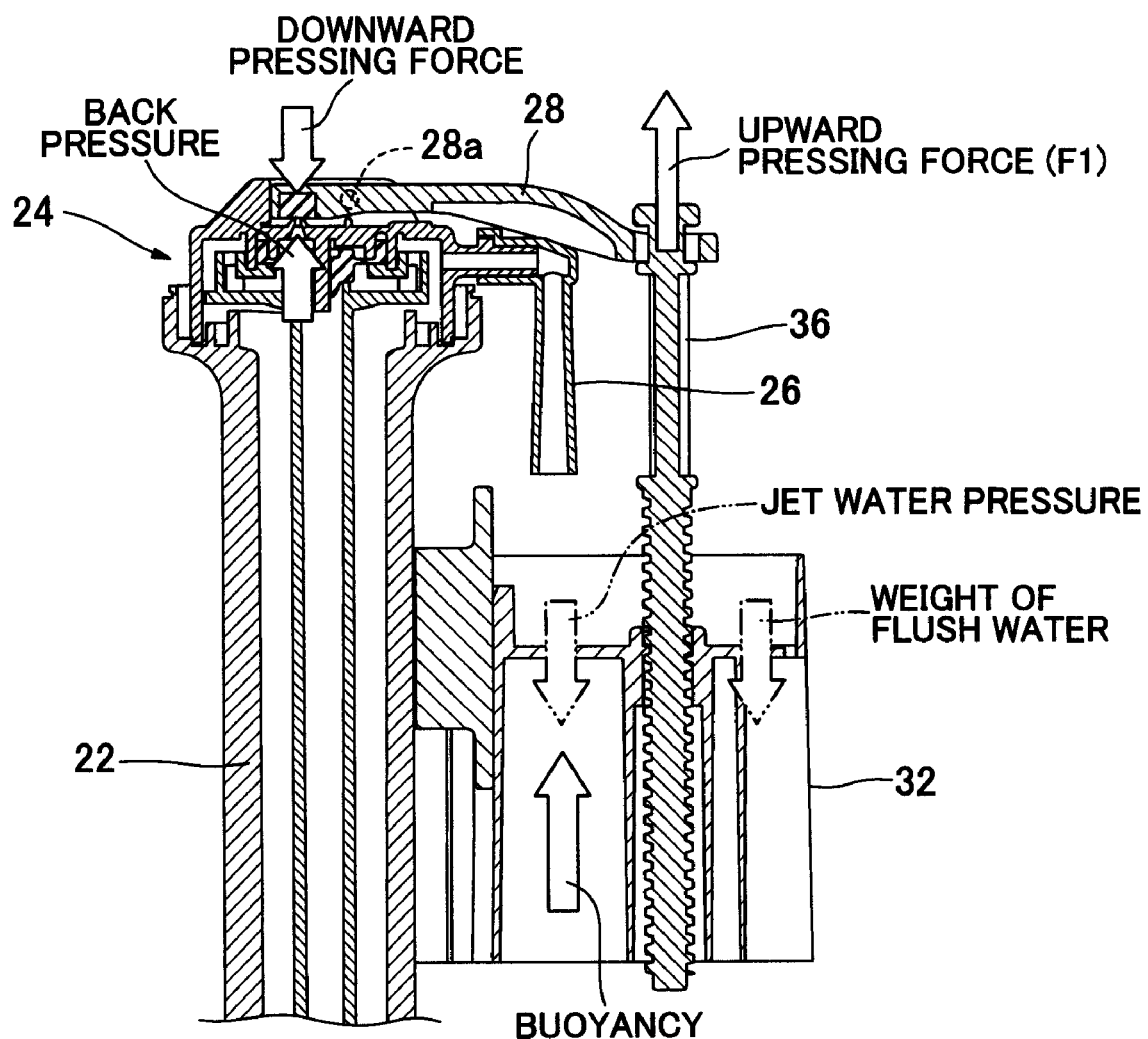
FIG. 17 is a partial sectional view showing a water supply valve immediately after blocking water flow in a toilet flush water supply device according to the first embodiment of the present invention.

As shown in FIG. 16, that is, in the region immediately prior to water stopping (=the unstable region), the upward "buoyancy", the "flush water weight (downward)" stored in the water storage enclosure portion 32b, and the "jet water pressure (downward)" caused by the flow of the jet spouted downward from the water spout pipe 26 each acts on the float 32. As a result, the value of the upward pressing force F1 is the "buoyancy" value minus the "weight of flush water" and the "jet water pressure" values.

Next, when the float 32 water level has risen only a small amount, immediately following water stoppage (=the unstable region), an upward "buoyancy" acts on the float 32, but because it is in a water stopping state, the "flush water weight (downward)" and the "jet water pressure (downward)" instantly cease to act thereon. As a result, only buoyancy acts on the upward pressing force F1, the "weight of flush water" and "jet water pressure" do not act thereon. In other words, to the extent that the "weight of flush water" and "jet water pressure" do not act on upward pressing force F1, an upward assisting force is being added thereto.

Thus in the present embodiment the value of the upward pressing force F1 acting on the right side end of the arm 28 increases instantaneously in the unstable region when transitioning from the supply water region to the stop water stable region, hence the unstable region state can be shortened by that amount, and a transition can be made from the water supply region to the water stopping stable region, skipping directly through the unstable region, thereby preventing occurrences of the hunting phenomenon.

The hunting phenomenon occurs more easily when the water supply source pressure (water main pressure) is high, but in this case high pressure flush water is spouted from the water spout pipe 26, causing the upward pressing force F1 to increase by the amount of that higher pressure, so that the hunting phenomenon can be more effectively suppressed.

Figure 18:
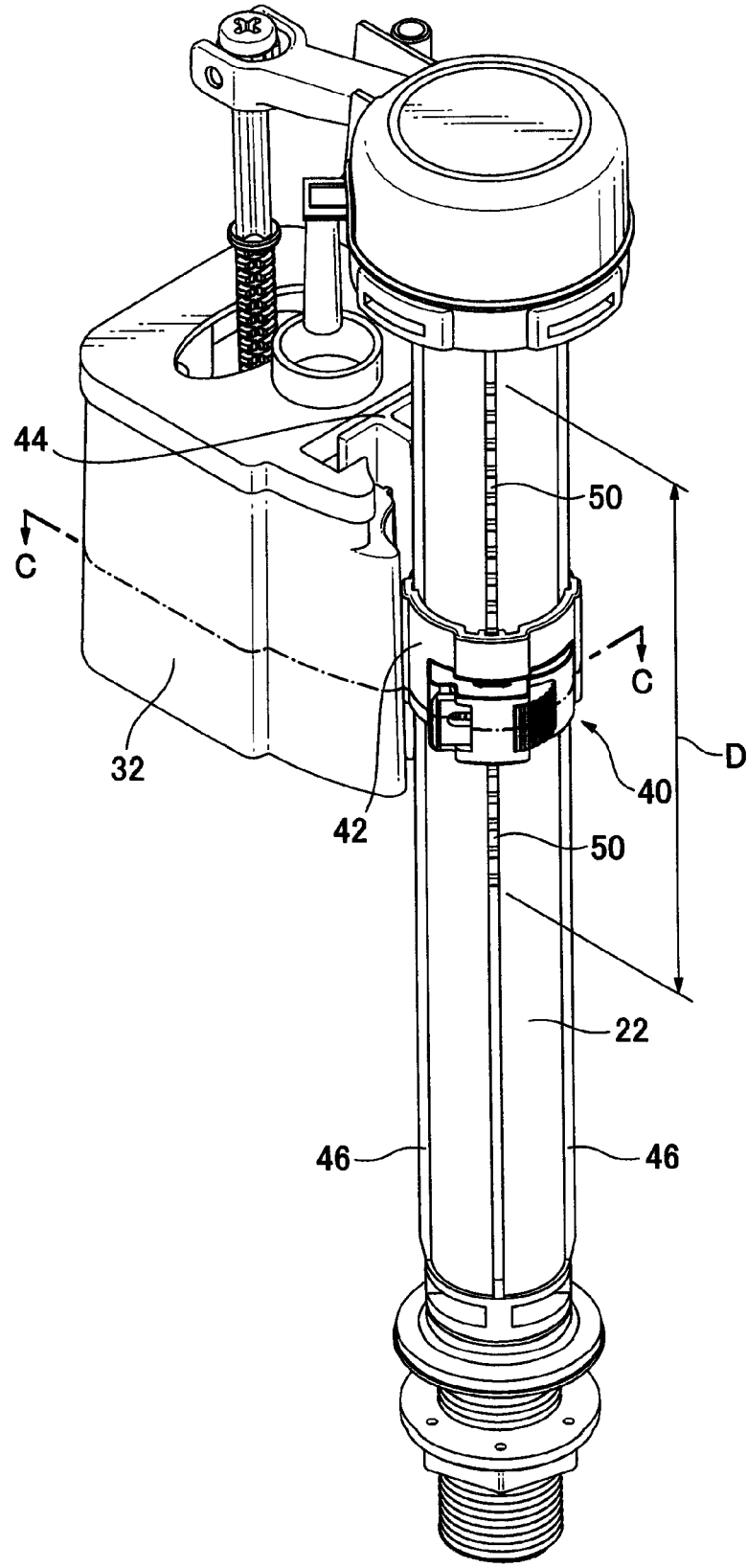
FIG. 18 is a perspective view showing a toilet flush water supply device according to a second embodiment of the present invention.
Figure 20:
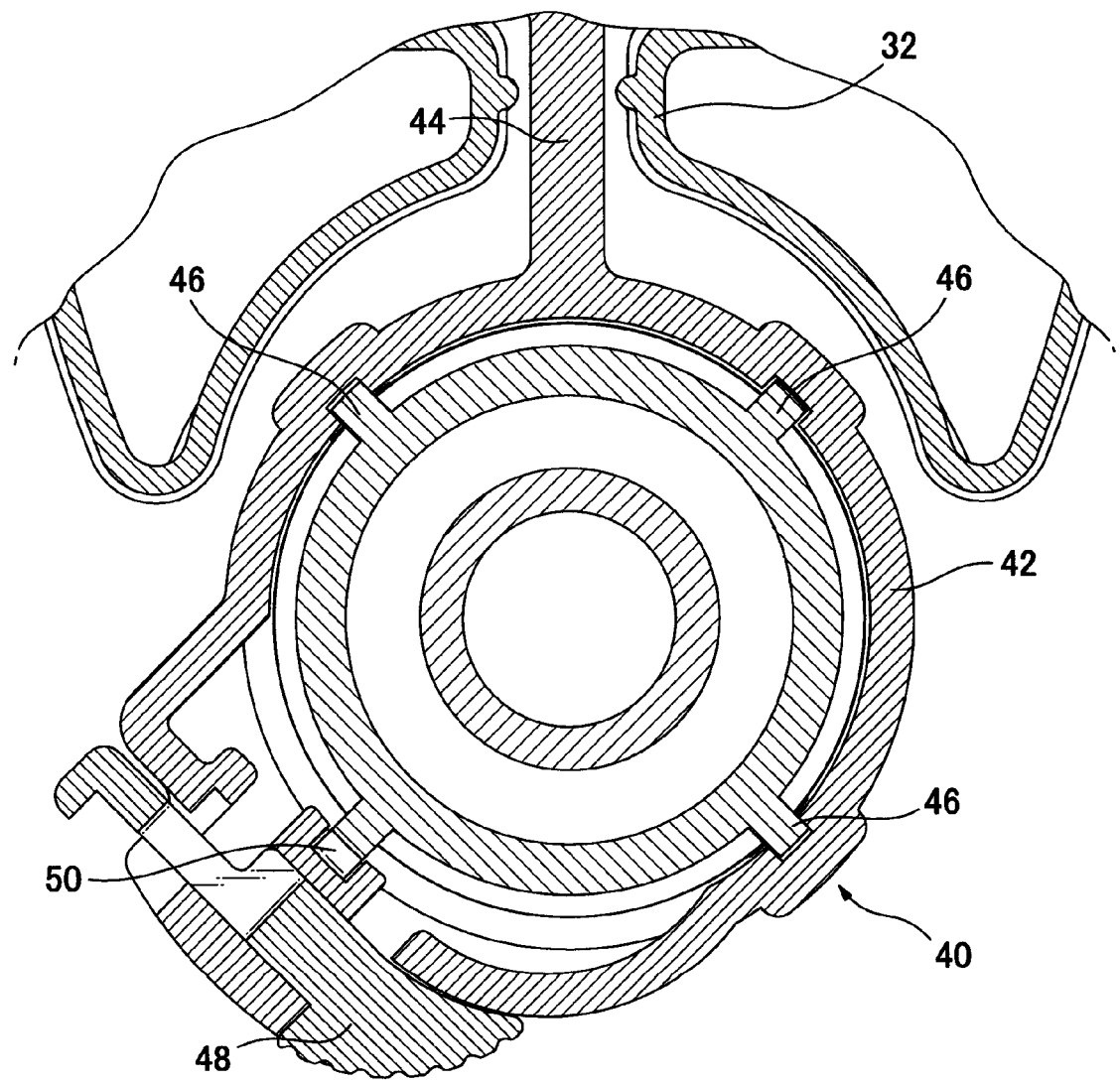
FIG. 20 is a partial enlarged sectional view of FIG. 19.
Figure 21A:
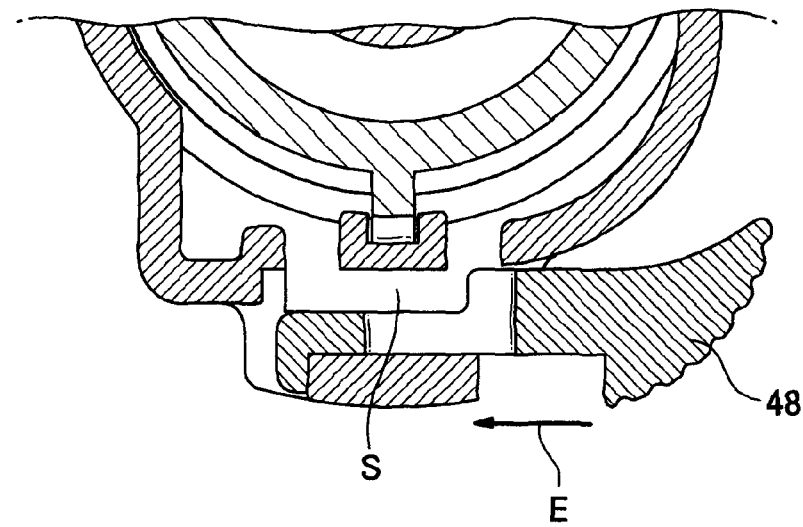
FIG. 21(*a*) is a partial plan view and FIG. 21(*b*) is a partial front elevation view, respectively showing a float guide at the stopper part release position in the second embodiment of the present invention.
Figure 21B:
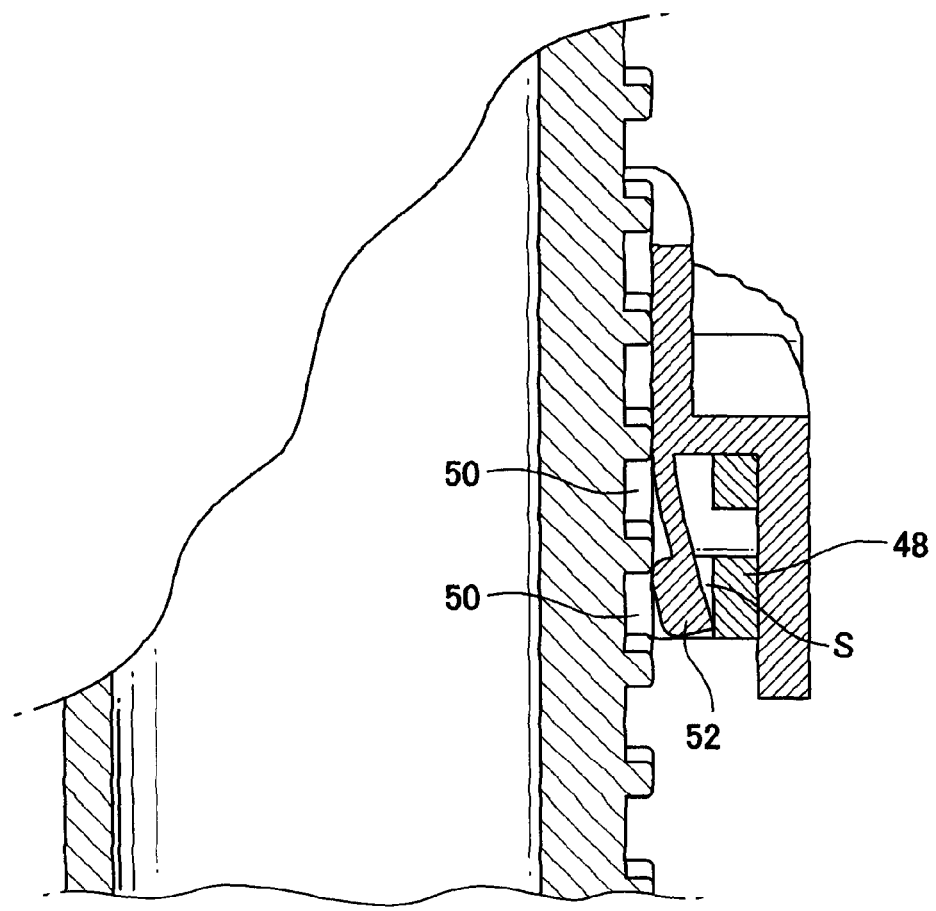

Next, referring to FIGS. 18 through 22, a toilet flush water supply device according to a second embodiment of the present invention will be explained. FIG. 18 is a perspective view showing a toilet flush water supply device according to a second embodiment of the present invention, FIG. 19 is a sectional view along line C-C in FIG. 18, FIG. 20 is a partial expanded sectional view of FIG. 19, and FIG. 21 is a partial plan view plan section (FIG. 21(a)) and a partial front elevation section (FIG. 21(b)) showing a float guide at the stopper part release position in a second embodiment of the present invention.

In the second embodiment of the present invention, the structure of the float guide is changed, other structures are the same as in the first embodiment. Therefore the float guide structure which differs from the first embodiment will be primarily explained.

Figure 19:
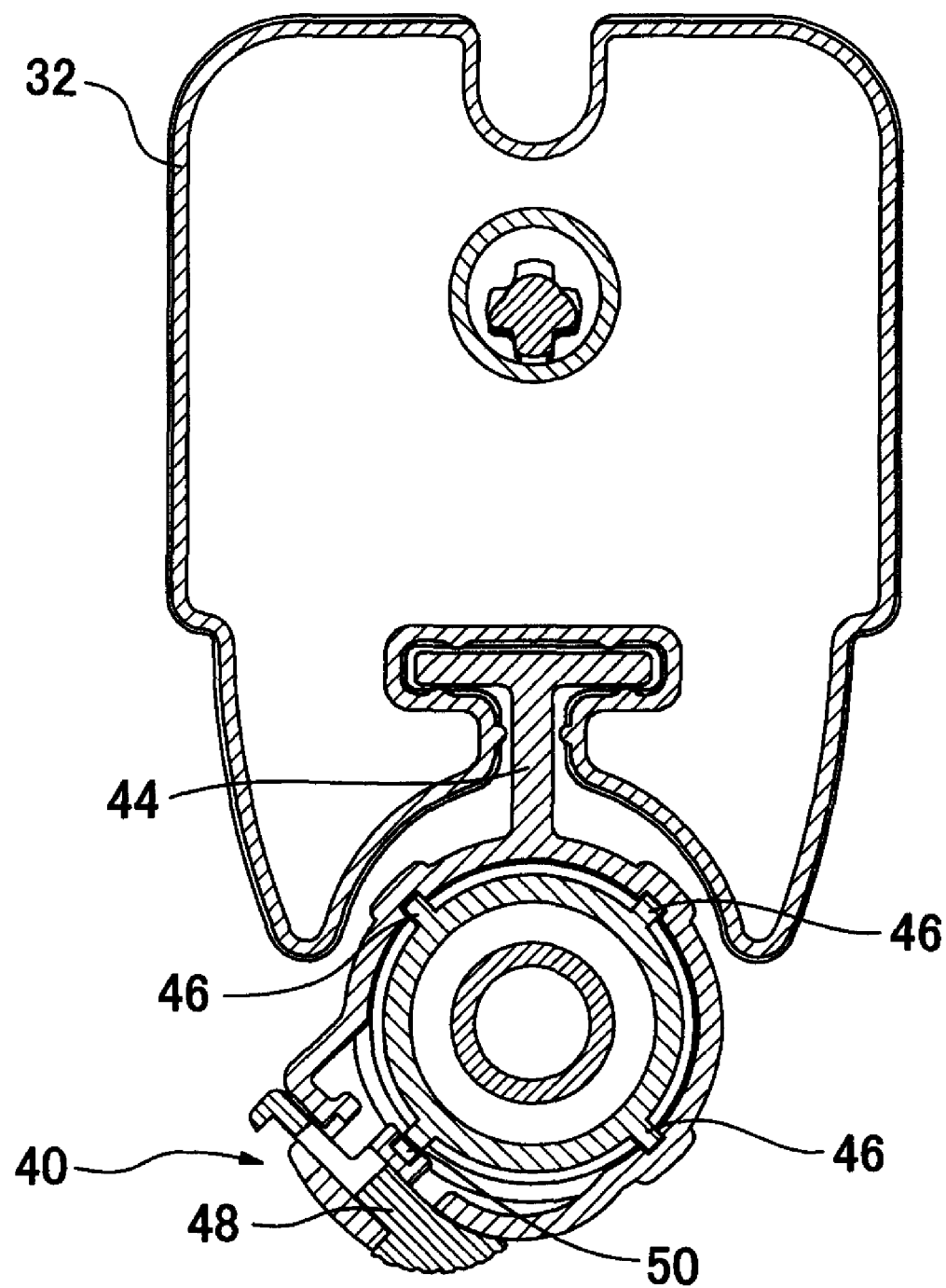
FIG. 19 is a sectional view along line C-C in FIG. 18.

First, as shown in FIGS. 18 and 19, the float guide 40 is of the type which penetrates the water supply pipe 22, comprising an attaching portion 42 which penetrates the water supply pipe 22 and is attached thereto, and a float slide plate 44 formed as an integral piece with the attaching portion 42.

The float guide 40 attaching portion 42 is guided by a guide rib 46 extending in an axial direction around the water supply pipe 22, and is capable of moving up or down.

At the attaching region D at the upper external perimeter to which the water supply pipe 22 float guide 40 is attached, there are also a plurality of float guide affixing channel portions 50, separated by gaps of specified length for the purpose of affixing the float guide 40 to the outer surface of the water supply pipe 22.

Figure 22A:
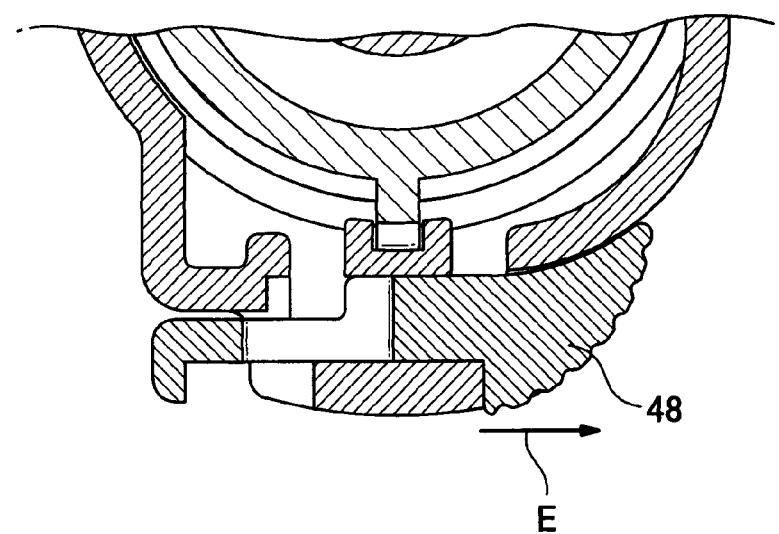
FIG. 22(*a*) is a partial plan view and FIG. 22(*b*) is a partial front elevation view, respectively showing a float guide at the stopper part fixed position in the second embodiment of the present invention.

Next, as shown in FIGS. 21 and 22, a float guide affixing boss portion 52 is integrally formed with the water supply pipe 22 at the part corresponding to the above-described float guide affixing channel portion 50 of the float guide 40 attaching portion 42.

A stopper piece 48 for affixing and releasing the attaching portion 42 to the water supply pipe 22 is disposed on the outside of the attaching portion 42 float guide affixing boss portion 52. This stopper piece 48 can move along the direction E perpendicular to the longitudinal axis of the water supply pipe 22. In addition, movement of this stopper piece 48 causes a space S to be formed between the attaching portion 42 float guide affixing boss portion 52 and the stopper piece 48, as shown in FIG. 21(b), when released as shown in FIG. 21.

Next a method for affixing the float guide 40 of the second embodiment to the outer surface of the water supply pipe 22 will be explained.

First, when attaching the water supply pipe 22 to the flush water tank 14, the float guide 40 is caused to penetrate and attach to the water supply pipe 22.

Next, after attaching the water supply pipe 22 to the flush water tank 14, the float guide 40 must be affixed at a position of desired height, but at this point the stopper piece 48 is first moved to the release position shown in FIG. 21. As shown in FIG. 21(b), and as described above, a space S is formed between the float guide affixing boss portion 52 and the stopper piece 48, and the back side (the outer side) of the attaching portion 42 float guide affixing boss portion 52 ceases to be restricted by the stopper piece 48.

In this state, moving the float guide 40 attaching portion 42 up or down causes the attaching portion 42 float guide affixing boss portion 52 which had been engaging the water supply pipe 22 float guide affixing channel portion 50 to deform toward the space S, so that engagement with the float guide affixing channel portion 50 is released, and movement up or down can occur.

Figure 22B:
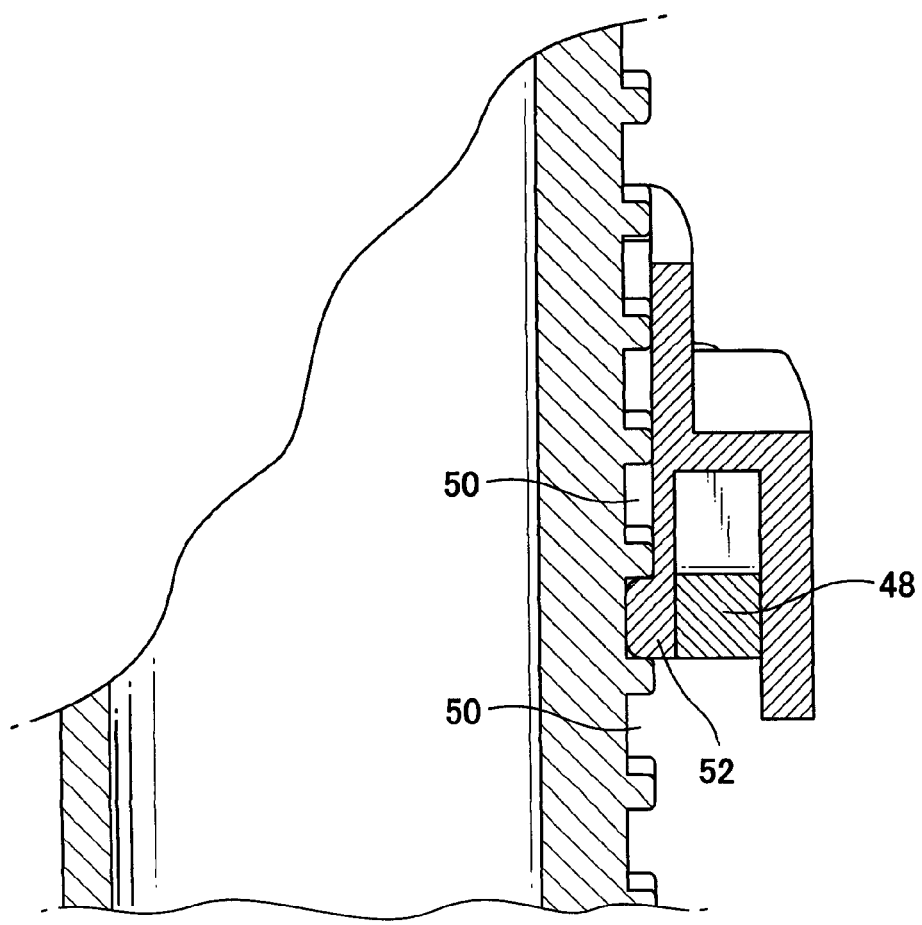

When the float guide 40 is moved to a position at a desired height and affixed to the outer surface of the water supply pipe 22, the stopper piece 48 is moved to a fixed position (see FIG. 22). At this point, as shown in FIG. 22(b), the float guide affixing boss portion 52 on the float guide 40 attaching portion 42 engages the water supply pipe 22 float guide affixing channel portion 50 and becomes non-deformable, by this means the float guide 40 is affixed at a position of desired height on the outer surface of the water supply pipe 22.

In the float guide 40 of the toilet flush water supply device according to the second embodiment, the attaching portion 42 penetrates and is attached to the water supply pipe 22, therefore the float guide 40 does not separate from the water supply pipe 22, and can be securely affixed thereto.

A plurality of water supply pipe 22 float guide affixing channel portions 50 are formed in the attaching region D extending up and down, therefore the float guide 40 can be easily positioned at a desired position.

Since the float guide 40 in the second embodiment can thus be attached to the water supply pipe 22 in a way which permits adjustment up or down, there is no need as in the past for removing the water supply pipe and the water supply valve from the flush water tank, and the vertical position of the float 32 can be easily adjusted.

Although the present invention has been explained with reference to a specific, preferred embodiment, one of ordinary skill in the art will recognize that modifications and improvements can be made while remaining within the scope and sprit of the present invention. The scope of the present invention is determined solely by the appended claims.

What is claimed is:

1. A toilet flush water supply device for supplying flush water to a flush water tank of a flush toilet, said toilet flush water supply device comprising:
   a water supply pipe connected to an external water supply source;
   a water supply valve for switching between spouting and stopping of flush water supplied from the water supply pipe into the flush water tank;
   a float for switching between the spouting and stopping of the above water supply valve by a vertical movement thereof linked to fluctuations in the flush water level within the flush water tank; and
   a float guide for guiding the vertical motion of the float, the float guide including an attaching portion disposed at a vertical position on an outer surface of the water supply pipe and a float sliding plate on which the float slides vertically;
   wherein said float includes a water storage enclosure portion formed on an upper portion thereof for receiving and storing at least a portion of the flush water spouted from the water supply valve when the water supply valve is in the water spouting state, and discharging the stored flush water when the water supply valve is in a water stopping state.

2. The toilet flush water supply device according to claim 1, wherein said attaching portion of the float guide is disposed such that the vertical position is adjustable up or down on the outer surface of the water supply pipe.

3. The toilet flush water supply device according to claim 1, wherein said attaching portion of the float guide is disposed so as to be horizontally detachable from the outer surface of the water supply pipe.

4. The toilet flush water supply device according to claim 1, wherein said attaching portion of the float guide is disposed so as to penetrate the water supply pipe.

5. The toilet flush water supply device according to claim 1, wherein at least one of the float sliding plate of the float guide and a part of the float guided by the float sliding plate includes a plurality of ribs extending in a vertical direction from a top edge to a bottom edge of the float sliding plate or the part of the float.

6. The toilet flush water supply device according to claim 1, wherein said water supply valve includes a spout pipe for spouting the flush water at supply source pressure to the water storage enclosure portion of the float, and a diameter of the water spout pipe increases in a direction from a top of the spout pipe towards a bottom of the spout pipe.

7. The toilet flush water supply device according to claim 1, wherein said float includes a cover for covering at least a vicinity of an opening portion of the water storage enclosure portion for receiving the flush water.

8. The toilet flush water supply device according to claim 2, wherein said attaching portion of the float guide is disposed so as to be horizontally detachable from the outer surface of the water supply pipe.

9. The toilet flush water supply device according to claim 2, wherein said attaching portion of the float guide is disposed so as to penetrate the water supply pipe.

10. The toilet flush water supply device according to claim 6, wherein said float includes a cover for covering at least a vicinity of an opening portion of the water storage enclosure portion for receiving the flush water.

11. The toilet flush water supply device according to claim 2, wherein the water supply pipe has a plurality of bosses formed on its outer surface and the float guide attaching portion defines a plurality of holes therein configured to engage with at least a portion of the plurality of bosses on the water supply pipe, wherein the number of holes is less than the number of bosses such that the vertical position of the float guide is adjustable up or down on the outer surface of the water supply pipe.

12. A toilet flush water supply device for supplying flush water to a flush water tank of a flush toilet, said toilet flush water supply device comprising:
   a water supply pipe connected to an external water supply source;
   a water supply valve for switching between spouting and stopping of flush water supplied from the water supply pipe into the flush water tank;
   a float for switching between the spouting and stopping of the above water supply valve by a vertical movement thereof linked to fluctuations in the flush water level within the flush water tank; and
   a float guide for guiding the vertical motion of the float, the float guide including an attaching portion disposed at a vertical position on an outer surface of the water supply pipe and a float sliding plate on which the float slides vertically;
   wherein said attaching portion of the float guide is disposed so as to penetrate the water supply pipe.

13. The toilet flush water supply device according to claim 12, wherein said float includes a water storage enclosure portion formed on an upper portion thereof for receiving and storing at least a portion of the flush water spouted from the water supply valve when the water supply valve is in the water spouting state, and discharging the stored flush water when the water supply valve is in a water stopping state.

* * * * *